United States Patent
Saeki et al.

(10) Patent No.: US 10,710,642 B2
(45) Date of Patent: Jul. 14, 2020

(54) VEHICLE FRONT STRUCTURE

(71) Applicant: TOYOTA JIDOSHA KABUSHIKI KAISHA, Toyota-shi, Aichi-ken (JP)

(72) Inventors: Koji Saeki, Okazaki (JP); Takanori Uehata, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 71 days.

(21) Appl. No.: 16/207,619

(22) Filed: Dec. 3, 2018

(65) Prior Publication Data

US 2019/0176897 A1 Jun. 13, 2019

(30) Foreign Application Priority Data

Dec. 11, 2017 (JP) ................................. 2017-236745

(51) Int. Cl.
| | | |
|---|---|---|
| *B62D 25/08* | (2006.01) | |
| *B62D 27/02* | (2006.01) | |
| *B62D 25/04* | (2006.01) | |

(52) U.S. Cl.
CPC .......... *B62D 25/081* (2013.01); *B62D 25/04* (2013.01); *B62D 27/02* (2013.01); *B62D 27/023* (2013.01); *B62D 25/08* (2013.01)

(58) Field of Classification Search
CPC ...... B62D 25/081; B62D 25/04; B62D 27/02; B62D 27/023; B62D 25/08
See application file for complete search history.

(56) References Cited

U.S. PATENT DOCUMENTS

| | | | | |
|---|---|---|---|---|
| 9,321,488 | B2* | 4/2016 | Kawachi | B62D 25/04 |
| 9,725,122 | B2* | 8/2017 | Kim | B60R 19/24 |
| 9,988,100 | B2* | 6/2018 | Kim | B62D 25/082 |
| 10,112,651 | B2* | 10/2018 | Takeda | B62D 21/11 |
| 2011/0101735 | A1* | 5/2011 | Fujita | B62D 21/152 |
| | | | | 296/193.06 |
| 2011/0148151 | A1* | 6/2011 | Abe | B60R 19/34 |
| | | | | 296/203.02 |
| 2012/0187719 | A1* | 7/2012 | Fujii | B62D 21/152 |
| | | | | 296/187.09 |
| 2013/0181482 | A1 | 7/2013 | Suzaki et al. | |
| 2014/0084634 | A1* | 3/2014 | Suzuki | B62D 25/082 |
| | | | | 296/205 |
| 2015/0166123 | A1* | 6/2015 | Park | B62D 25/082 |
| | | | | 296/187.1 |

(Continued)

FOREIGN PATENT DOCUMENTS

| | | | |
|---|---|---|---|
| JP | 2010-155491 A | 7/2010 | |
| JP | 2013-144525 A | 7/2013 | |
| JP | 2017065361 A * | 4/2017 | .............. B60R 19/34 |

*Primary Examiner* — Lori L Lyjak
(74) *Attorney, Agent, or Firm* — Oliff PLC

(57) ABSTRACT

In a vehicle front structure including a cowl top side, a front pillar, and a side member outer, an upper wall portion of an inner of the cowl top side is provided with an inclined portion provided continuously with a top face portion extending downward toward the front side in the vehicle front-rear direction from a boundary portion between the side member outer and a base of the front pillar, and a flat portion connected to a front face portion along the vehicle up-down direction in the side member outer in a state where the flat portion is brought into surface contact with the front face portion of the side member outer.

6 Claims, 4 Drawing Sheets

(56) References Cited

U.S. PATENT DOCUMENTS

| | | | |
|---|---|---|---|
| 2016/0046325 A1* | 2/2016 | Yamamoto | B62D 25/04 |
| | | | 296/187.09 |
| 2017/0158246 A1* | 6/2017 | Kang | B62D 25/081 |
| 2017/0166259 A1* | 6/2017 | Kim | B62D 25/082 |
| 2020/0047696 A1* | 2/2020 | Atsumi | B60R 19/12 |
| 2020/0062314 A1* | 2/2020 | Matsuoka | B62D 25/088 |

* cited by examiner

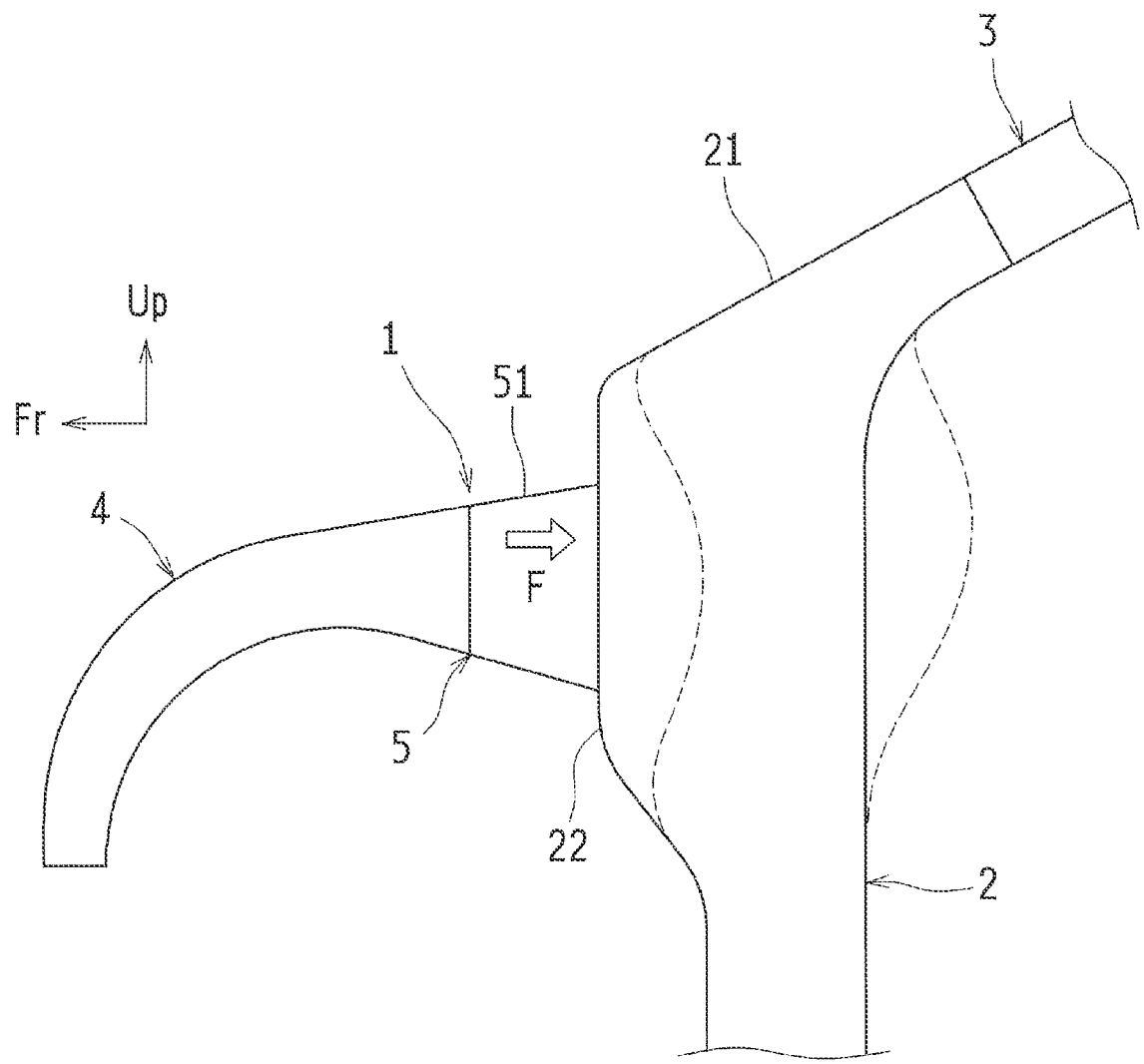

VEHICLE FRONT STRUCTURE

CROSS-REFERENCE TO RELATED APPLICATIONS

This application claims priority to Japanese Patent Application No. 2017-236745 filed on Dec. 11, 2017, which is incorporated herein by reference in its entirety.

BACKGROUND

1. Technical Field

The disclosure relates to a vehicle front structure in which a cowl top side is connected to a front pillar via a side member outer.

2. Description of Related Art

For example, a cowl top side connecting structure is described in Japanese Patent No. 5109969 (Japanese Unexamined Patent Application Publication No. 2010-155491 (JP 2010-155491 A)). The cowl top side connecting structure includes a cowl top side, a cowl top side inner, and a gusset.

The cowl top side constitutes either end, in the vehicle width direction, of a cowl top forming a lower side of a window on a front surface of a vehicle body and connecting right and left front pillars.

The cowl top side inner forms at least an upper wall portion and an inner wall portion, in the vehicle width direction, of the cowl top side. The cowl top side inner includes: an upper flange formed in a rear edge portion of the upper wall portion so as to be directed upward in the up-down direction of the vehicle body; an inner flange formed in a rear edge portion of the inner wall portion in the vehicle width direction so as to be directed inwardly in the vehicle width direction, the inner flange being connected to the front pillar; and a connecting flange configured to connect the upper flange to the inner flange over an edge line between the upper wall portion and the inner wall in the vehicle width direction, the connecting flange having a width narrower than the upper flange and the inner flange.

The gusset includes a vertical wall portion connected to a front wall portion of the front pillar, and a front wall portion formed forward in the front-rear direction of the vehicle body from the vertical wall portion and connected to the upper wall portion of the cowl top side inner.

In a front view of the vehicle body, the straight line that links an innermost connecting point, in the vehicle width direction, between the vertical wall portion of the gusset and the front pillar with an uppermost connecting point, in the up-down direction of the vehicle body, between the inner flange of the cowl top side inner and the front pillar passes below an outer side, in the vehicle width direction, of the edge line between the upper wall portion of the cowl top side inner and the inner wall portion thereof in the vehicle width direction.

SUMMARY

In Japanese Patent No. 5109969 (JP 2010-155491 A), when a load directed rearward in the vehicle front-rear direction is input into the cowl top side like a case of a small overlap (SOL) collision or the like, for example, the load is transmitted to the front wall portion of the front pillar through the gusset. Accordingly, the load is easily applied to a body constituting a cabin of the vehicle in a concentrated manner, and thus, a deformation amount of the body might increase.

In view of such circumstances, the disclosure provides a vehicle front structure including a cowl top side, a front pillar, and a side member outer provided so as to connect the cowl top side to the front pillar, the vehicle front structure being configured to restrain deformation of a body constituting a cabin of a vehicle at the time when a load directed rearward is input from the front side in the vehicle front-rear direction.

In view of this, one aspect of the disclosure provides a vehicle front structure including a cowl top side, a front pillar, and a side member outer. The cowl top side is configured to connect an inner to an outer so as to secure a tubular space, the inner being placed on the inner side in the vehicle right-left direction, the outer being placed on the outer side in the vehicle right-left direction. The side member outer is provided so as to connect the cowl top side to the front pillar. The inner includes at least an upper wall portion and a side wall portion. The side wall portion is connected to the inner side, in the vehicle right-left direction, of the upper wall portion such that the side wall portion extends downward in the vehicle up-down direction. The upper wall portion of the inner is provided with an inclined portion and a flat portion. The inclined portion is provided continuously with a top face portion extending downward toward the front side in the vehicle front-rear direction from a boundary portion between the side member outer and a base of the front pillar. And the flat portion is connected to a front face portion of the side member outer along the vehicle up-down direction in a state where the flat portion is brought into surface contact with the front face portion of the side member outer.

In the vehicle front structure, the inner may further include a lower wall portion. The upper wall portion, the side wall portion, and the lower wall portion may have a substantially lateral square-U-shaped section perpendicular to the vehicle front-rear direction. Further, in the vehicle front structure, the inclined portion may be provided on the outer side of the top face portion in the vehicle right-left direction. Further, the inclined portion may be connected to the outer.

With such a configuration, when a load directed rearward is input into the cowl top side from the front side in the vehicle front-rear direction like a case of a small overlap collision or the like, for example, the load is transmitted to the side member outer through the inclined portion and the flat portion.

That is, in the above configuration, two load transmission paths are secured, that is, multiple load paths are enabled, so that the load is dispersedly applied to a body constituting a cabin of the vehicle, thereby making it possible to restrain deformation of the body.

Further, in the vehicle front structure, the inclined portion may include a first inclined portion and a second inclined portion. The first inclined portion may be provided in a front-side region, in the vehicle front-rear direction, of the upper wall portion of the inner. And the second inclined portion may be provided in a rear-side region, in the vehicle front-rear direction, of the upper wall portion of the inner. And an inclination angle of the second inclination portion may be larger than an inclination angle of the first inclined portion. The flat portion may be provided in a rear end, in the vehicle front-rear direction, of the upper wall portion of the inner so as to rise upward in the vehicle up-down direction.

In such a configuration, the inclination is provided gradually from the first inclined portion to the second inclined portion, and therefore, even if a step between the upper wall portion of the inner and the top face portion of the side member outer is large, the inclination angle of the first inclined portion and the inclination angle of the second inclined portion can be set relatively small.

Incidentally, in a configuration provided with a single inclined portion, for example, in a case where a step between the upper wall portion of the inner and the top face portion of the side member outer is large, it is necessary for the single inclined portion to have a large inclination angle. In a case where the inclination angle of the inclined portion is too large, the inclined portion might be buckled at the time when a load directed rearward is input from the front side in the vehicle front-rear direction, and therefore, there occurs such a concern that the load is not transmitted to the side member outer via a diagonally upward path. That is, it may be said that such a concern can be avoided when the inclined portion is constituted by the first inclined portion and the second inclined portion as described above.

Further, in the vehicle front structure, the first inclined portion and the second inclined portion may be provided in the upper wall portion of the inner at a position on an outer side in the vehicle right-left direction such that the first inclined portion and the second inclined portion protrude upward in the vehicle up-down direction from the upper wall portion.

With the vehicle front structure according to the disclosure, it is possible to restrain deformation of a body constituting a cabin of a vehicle at the time when a load directed rearward is input from the front side in the vehicle front-rear direction.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 4 is a side view to describe a transmission path of a load in a vehicle front structure of a comparative example.

DETAILED DESCRIPTION OF EMBODIMENTS

The following describes a best embodiment for carrying out the disclosure in detail with reference to the attached drawings.

Figure 1:
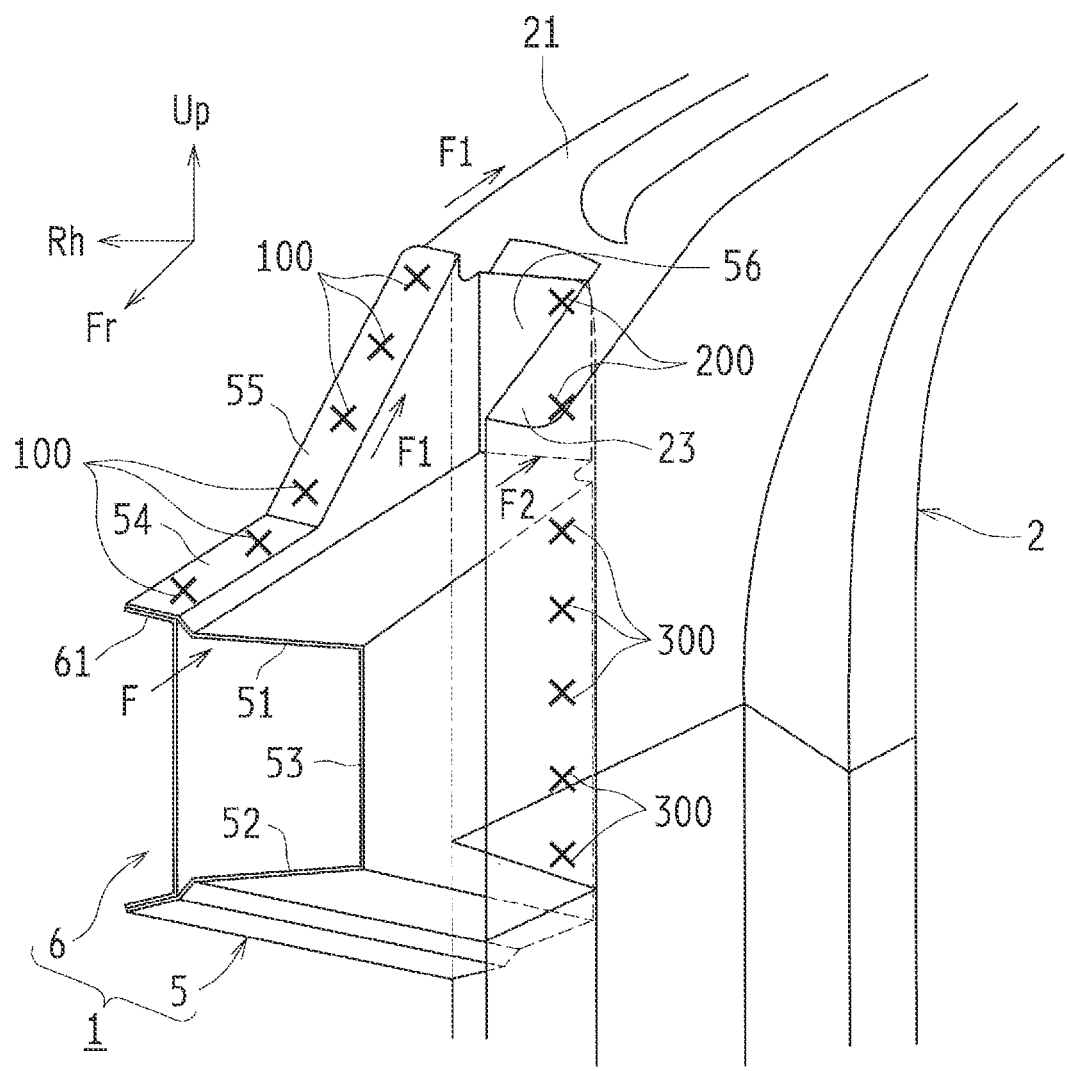
FIG. 1 is a perspective view schematically illustrating a state where an embodiment as an example of a vehicle front structure of the disclosure is attached to a vehicle.
Figure 2:
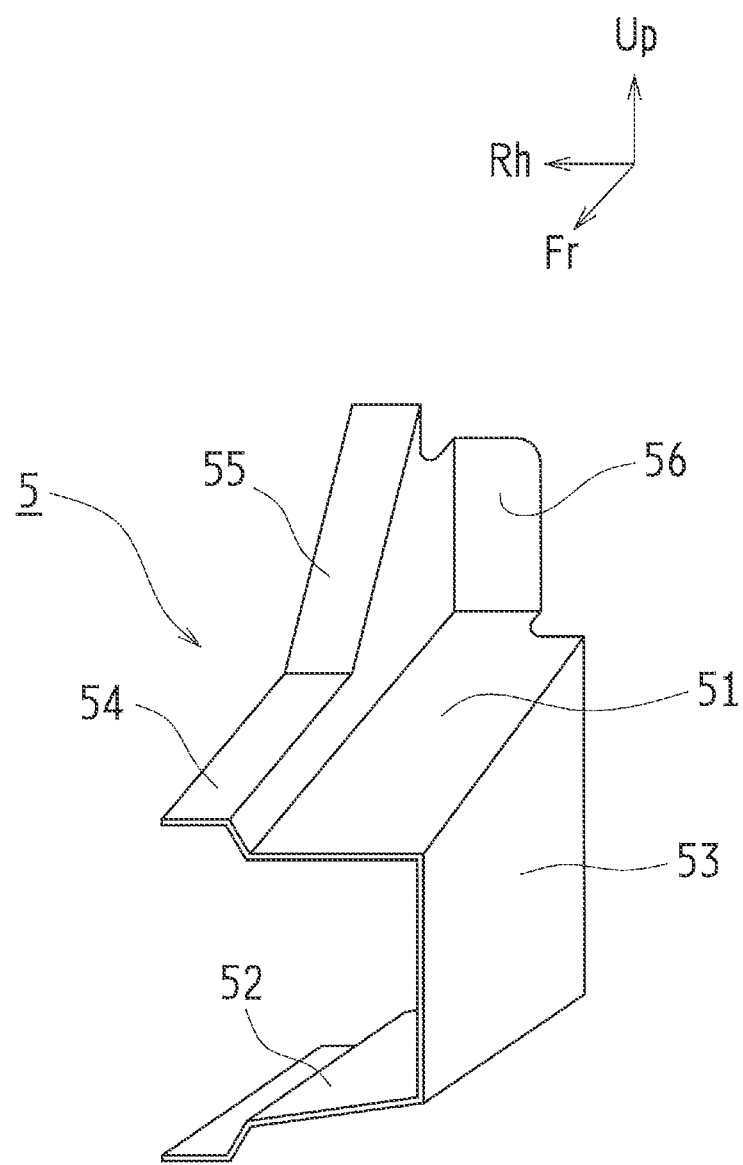
FIG. 2 is a perspective view illustrating only a cowl top side in FIG. 1.
Figure 3:
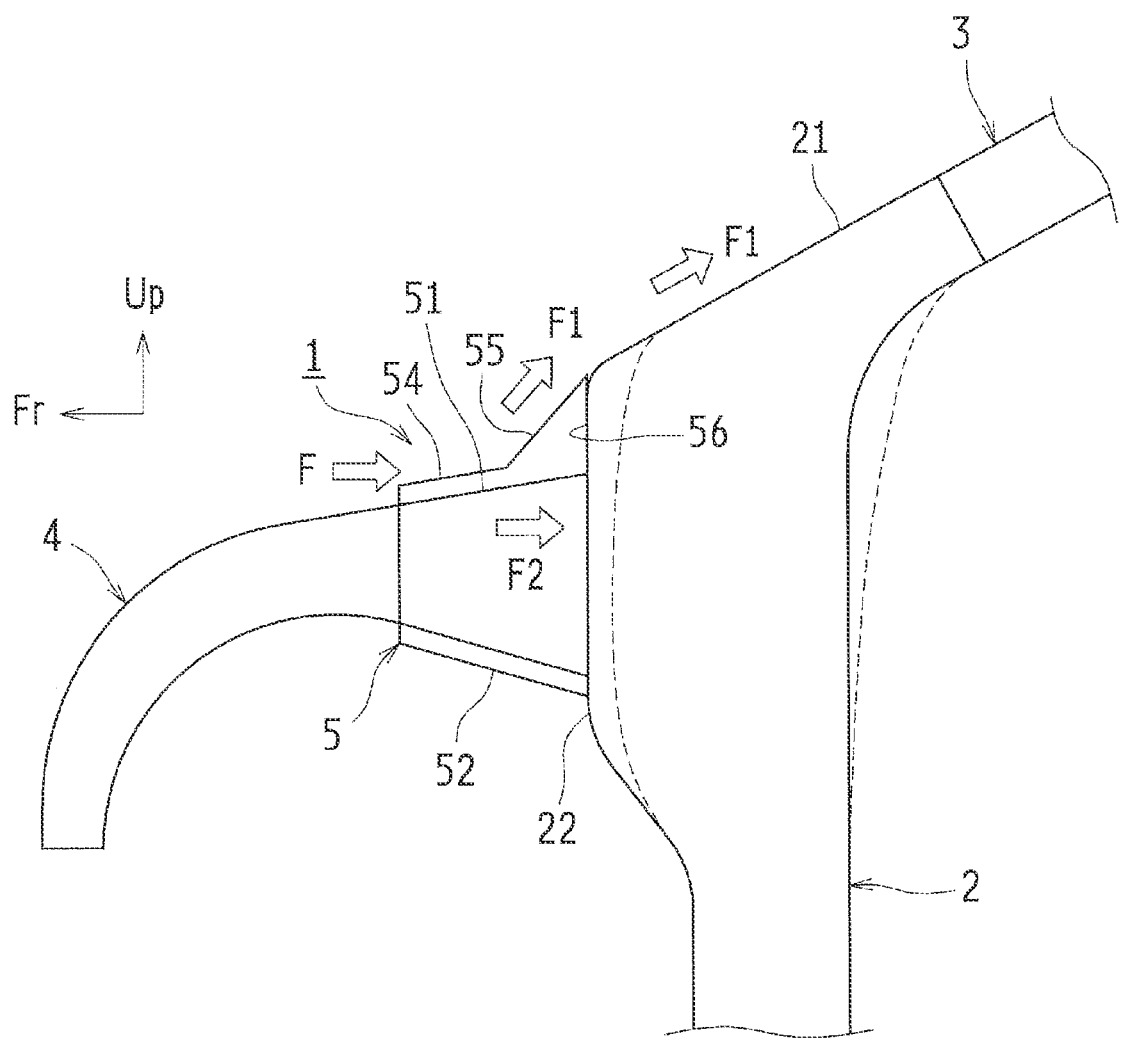
FIG. 3 is a side view to describe a transmission path of a load in FIG. 1.

One embodiment of the disclosure is illustrated in FIGS. 1 to 3. In each drawing, an arrow Up indicates the upper side in the vehicle up-down direction, an arrow Fr indicates the front side in the vehicle front-rear direction, and an arrow Rh indicates the right outward side in the vehicle right-left direction. Further, a cowl top side 1 is illustrated in FIG. 1.

A rear portion, in the vehicle front-rear direction, of the cowl top side 1 is connected to a front pillar 3 via a side member outer 2. Further, an outrigger 4 is connected to a front portion, in the vehicle front-rear direction, of the cowl top side 1. The outrigger 4 constitutes a part of a front suspension member.

The cowl top side 1 is configured such that a cowl top side inner 5 is connected to a cowl top side outer 6. The "cowl top side inner 5" is one example of an "inner" in the disclosure. Further, the "cowl top side outer 6" is one example of an "outer" in the disclosure.

The cowl top side inner 5 is placed on the inner side in the vehicle right-left direction and the cowl top side outer 6 is placed on the outer side in the vehicle right-left direction.

The cowl top side inner 5 is formed generally in a lateral square-U-shape in a front view and includes an upper wall portion 51, a lower wall portion 52, a side wall portion 53, and so on.

The side wall portion 53 is connected to an inner side, in the vehicle right-left direction, of the upper wall portion 51 so that the side wall portion 53 extends downward in the vehicle up-down direction, and the lower wall portion 52 is connected to a lower side, in the vehicle up-down direction, of the side wall portion 53 so that the lower wall portion 52 extends outward in the vehicle right-left direction.

The cowl top side outer 6 is connected to the cowl top side inner 5 so as to close an outward opened part of the cowl top side inner 5. By connecting such a cowl top side outer 6 to the cowl top side inner 5, a tubular space is secured therebetween. Hereby, the cowl top side 1 has a hollow structure.

The upper wall portion 51 of the cowl top side inner 5 is provided with a first inclined portion 54, a second inclined portion 55, and a flat portion 56.

The first inclined portion 54 and the second inclined portion 55 are provided in the upper wall portion 51 of the cowl top side inner 5 so as to protrude upward in the vehicle up-down direction from the upper wall portion 51 at a position on the outer side in the vehicle right-left direction.

The first inclined portion 54 is provided in a front-side region, in the vehicle front-rear direction, of the upper wall portion 51, and the second inclined portion 55 is provided in a rear-side region, in the vehicle front-rear direction, of the upper wall portion 51. The first inclined portion 54 and the second inclined portion 55 are both formed so as to be inclined downward toward the front side in the vehicle front-rear direction.

The second inclined portion 55 is inclined continuously with a top face portion 21 extending downward toward the front side in the vehicle front-rear direction from a boundary portion between the side member outer 2 and a base of the front pillar 3. Note that the second inclined portion 55 has an inclination angle larger than the inclination angle of the first inclined portion 54.

The first inclined portion 54 and the second inclined portion 55 are connected to an upper wall portion 61 of the cowl top side outer 6 by spot welding or the like, for example, performed in the vehicle up-down direction at positions 100 each indicated by a cross mark in FIG. 1 in a state where the first inclined portion 54 and the second inclined portion 55 are put on their corresponding parts (not shown) of the upper wall portion 61 so as to make surface contact therewith in the vehicle up-down direction. The number of connection positions (e.g., the number of spot welding points) 100 can be set optionally.

The flat portion 56 is provided such that the flat portion 56 rises upward in the vehicle up-down direction from a rear end, in the vehicle front-rear direction, of the upper wall portion 51 of the cowl top side inner 5. The flat portion 56 is connected to a front face portion 22 along the vehicle up-down direction in the side member outer 2, for example, by spot welding or the like performed in the vehicle front-rear direction at positions 200 each indicated by a cross mark in FIG. 1 in a state where the flat portion 56 is put on the front face portion 22 so as to make surface contact therewith in the vehicle front-rear direction. The number of connection positions (e.g., the number of spot welding points) 200 can be set optionally.

Note that the side wall portion 53 of the cowl top side inner 5 is connected to a front-end overhanging portion 23 of the side member outer 2, for example, by spot welding or the like performed in the vehicle right-left direction at positions 300 each indicated by a cross mark in FIG. 1 in a state where the side wall portion 53 is put on the front-end overhanging portion 23 so as to make surface contact therewith in the vehicle right-left direction. The number of connection positions (e.g., the number of spot welding points) 300 can be set optionally.

Next will be described an action and an effect obtained when the cowl top side 1 of this embodiment is provided in the vehicle.

For example, when a load (F) directed rearward is input into the cowl top side 1 from the front side in the vehicle front-rear direction like a case of a small overlap collision or the like, the load (F) is transmitted to the front pillar 3 via the top face portion 21 of the side member outer 2 through the first inclined portion 54 and the second inclined portion 55 of the cowl top side inner 5, and is also transmitted to the front face portion 22 of the side member outer 2 through the flat portion 56 of the cowl top side inner 5 (see arrows F1, F2 illustrated in FIGS. 1 and 3).

As such, two load transmission paths are secured, that is, multiple load paths are enabled, so that the load (F) is dispersedly applied to a body (not shown) constituting a cabin of the vehicle, thereby making it possible to restrain a deformation (see a broken line in FIG. 3) of the body.

Particularly, a load F1 transmitted to the side member outer 2 through the flat portion 56 causes the flat portion 56 to directly face the connecting positions 200 with the side member outer 2, so that the load F1 is not applied to the connecting positions 200 in a direction shearing the connecting positions 200. On this account, the flat portion 56 of the cowl top side inner 5 can be hardly removed.

In contrast, in a configuration (a comparative example) in which the first inclined portion 54 and the second inclined portion 55 of the embodiment are not provided, when a load (F) directed rearward is input into the cowl top side 1 from the front side in the vehicle front-rear direction like a case of a small overlap collision or the like, as illustrated in FIG. 4, for example, the load (F) is transmitted generally linearly to the front face portion 22 of the side member outer 2 through the upper wall portion 51 of the cowl top side inner 5 without changing its direction.

As such, the load (F) is transmitted to the front face portion 22 of the side member outer 2 through the upper wall portion 51 of the cowl top side inner 5 in a concentrated manner, so that a deformation amount (see a broken line in FIG. 4) of the body (not shown) constituting the cabin of the vehicle is large.

As described above, in the embodiment to which the disclosure is applied, when a load is input like a case of a small overlap collision or the like, for example, the load can be transmitted dispersedly, thereby making it possible to restrain deformation of the body of the vehicle.

Note that the disclosure is not limited to the above embodiment and can be modified appropriately within the scope of Claims and within a scope equivalent thereto.

The embodiment deals with an example in which the upper wall portion 51 of the cowl top side inner 5 is provided with the first inclined portion 54 and the second inclined portion 55. However, the disclosure is not limited to this.

For example, as a modification of the vehicle front structure of the present embodiment, a single inclined portion may be provided in the upper wall portion 51 of the cowl top side inner 5 such that the inclined portion is inclined so as to be connected to the top face portion 21 extending downward toward the front side in the vehicle front-rear direction from the boundary portion between the side member outer 2 and the base of the front pillar 3, although not illustrated herein.

Even in this case, it is possible to obtain an action and an effect similar to the above embodiment, and therefore, a detailed description thereof is omitted herein.

The disclosure is preferably applicable to a vehicle front structure in which a cowl top side is connected to a front pillar via a side member outer.

What is claimed is:

1. A vehicle front structure comprising:
   a cowl top side configured to connect an inner to an outer so as to secure a tubular space, the inner being placed on an inner side in a vehicle right-left direction, the outer being placed on an outer side in the vehicle right-left direction;
   a front pillar; and
   a side member outer provided so as to connect the cowl top side to the front pillar, wherein:
   the inner includes at least an upper wall portion and a side wall portion;
   the side wall portion is connected to an inner side, in the vehicle right-left direction, of the upper wall portion such that the side wall portion extends downward in a vehicle up-down direction; and
   the upper wall portion of the inner is provided with an inclined portion and a flat portion, the inclined portion being provided continuously with a top face portion extending downward toward a front side in a vehicle front-rear direction from a boundary portion between the side member outer and a base of the front pillar, and the flat portion being connected to a front face portion of the side member outer along the vehicle up-down direction in a state where the flat portion is brought into surface contact with the front face portion of the side member outer.

2. The vehicle front structure according to claim 1, wherein:
   the inner further includes a lower wall portion; and
   the upper wall portion, the side wall portion, and the lower wall portion have a substantially lateral square-U-shaped section perpendicular to the vehicle front-rear direction.

3. The vehicle front structure according to claim 1, wherein the inclined portion is provided on an outer side of the top face portion in the vehicle right-left direction.

4. The vehicle front structure according to claim 1, wherein the inclined portion is connected to the outer.

5. The vehicle front structure according to claim 1, wherein:
   the inclined portion includes a first inclined portion and a second inclined portion;
   the first inclined portion is provided in a front-side region, in the vehicle front-rear direction, of the upper wall portion of the inner;

the second inclined portion is provided in a rear-side region, in the vehicle front-rear direction, of the upper wall portion of the inner;

an inclination angle of the second inclined portion is larger than an inclination angle of the first inclined portion; and the flat portion is provided in a rear end, in the vehicle front-rear direction, of the upper wall portion of the inner so as to rise upward in the vehicle up-down direction.

6. The vehicle front structure according to claim 5, wherein the first inclined portion and the second inclined portion are provided in the upper wall portion of the inner at a position on the outer side in the vehicle right-left direction such that the first inclined portion and the second inclined portion protrude upward in the vehicle up-down direction from the upper wall portion.

* * * * *